Feb. 8, 1955  C. A. FRENCH  2,701,656
HYDRAULIC TAIL GATE HOIST
Filed Nov. 10, 1952

INVENTOR
CHARLES A. FRENCH

ATTORNEY

United States Patent Office 2,701,656
Patented Feb. 8, 1955

2,701,656

HYDRAULIC TAIL GATE HOIST

Charles A. French, Lulu Island, British Columbia, Canada

Application November 10, 1952, Serial No. 319,744

4 Claims. (Cl. 214—75)

My invention relates to improvements in hydraulic tailgate hoists.

The objects of the present invention are to provide a tailgate for a truck body which serves as a raising and lowering platform to facilitate loading and unloading, and to provide a hoist having relatively few moving parts and which may be easily fitted to trucks now in use. These and further objects of the invention will appear as the specification proceeds.

Referring to the accompanying drawings.

In the drawings like characters of reference indicate corresponding parts in each figure.

Figure 1:
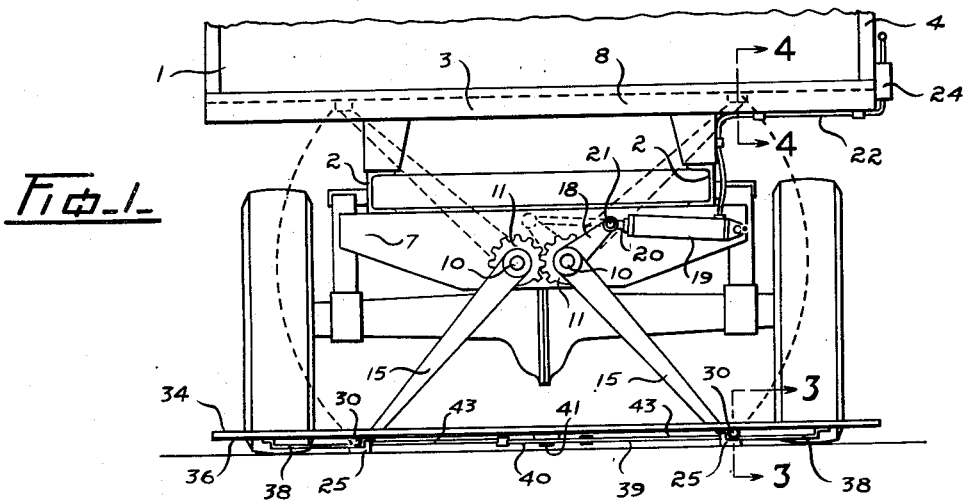
Figure 1 is a rear elevational view of a truck fitted with the invention.

The numeral 1 indicates generally a truck having longitudinal frame members 2 which support a platform 3 fitted with a body 4. A transverse member 7 is secured beneath the frame members 2 adjacent the rear edge 8 of the truck platform 3. Journalled upon the member 7 is a pair of spaced rearwardly extending spindles 10 which are fitted with intermeshing toothed quadrants 11. The outer ends of the spindles 10 are fitted with diverging arms 15 which are adapted to swing in a vertical plane parallel to and in close proximity with the rear edge 8 of the platform 3. A crank 18 is secured to one of the spindles 10 and adjacent said crank a hydraulic reciprocating cylinder 19 is mounted upon the transverse member 7. The cylinder 19 is provided with a piston rod 20 which is connected to the crank 18 by a pin 21. Fluid under pressure is adapted to be supplied to the cylinder 19 through a line 22 from a suitable source of supply, not shown. The line 22 is fitted with a manually operated valve 24 which is preferably located on the side of the truck body adjacent the rear edge 8.

Figure 5:
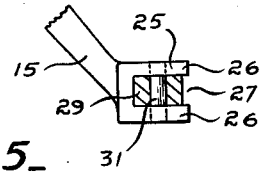
Figure 5 is an elevational view part in section, of the free end of one of the arms.
Figure 2:
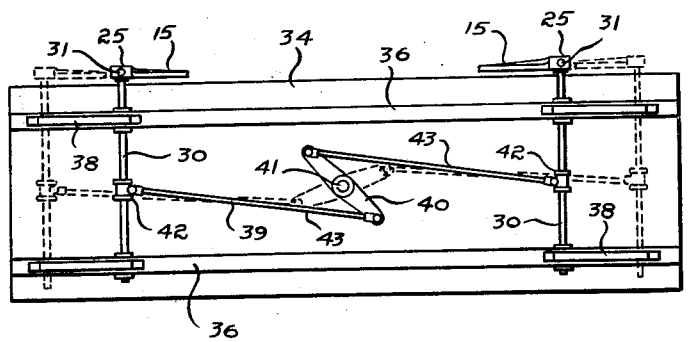
Figure 2 is a plan view of the underside of the tailgate.

The free end of each arm 15 is provided with a fork 25, see Figure 5, having spaced parallel prongs 26 which define a rectangular slot 27. Mounted in each slot is the head 29 of a shaft 30, which head is of a cross sectional dimension to closely fit said slot and is held therein by means of a pin 31. The inner corner of the heads is rounded as at 32 for a purpose which will later appear.

Supported upon the shafts 30 is a tailgate 34 which is provided on its underside with transverse members 36. Connected to the members adjacent the ends of the platform, is a pair of elongated keepers 38 in which the shafts have sliding movement. Connecting the shafts 30 is a linkage 39 consisting of a toggle lever 40 which is rockingly mounted upon a centrally disposed pin 41. A sleeve 42 is freely journalled upon each of the shafts and is pivotally connected to an end of the lever 40 by a rod 43.

Figure 4:
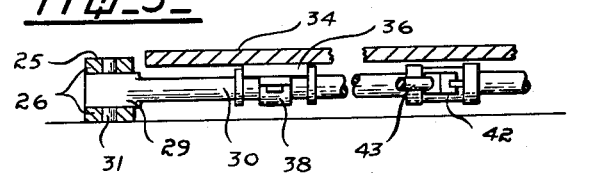
Figure 4 is a similar view taken on the line 4—4 of Figure 1.
Figure 3:
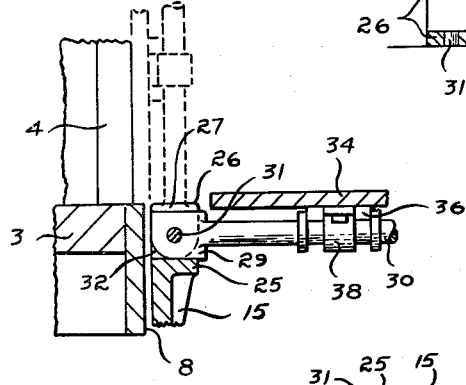
Figure 3 is an enlarged fragmentary view taken on the line 3—3 of Figure 1.

The control valve 25 is actuated to lower the tailgate 34 to a convenient height for loading purposes and with the load in position is again actuated so that said tailgate is raised to the level of the truck platform. During this vertical movement of the tailgate the shafts 30 transverse the arcuate paths indicated in dotted line in Figure 1 and the linkage 39 ensures that the pin 41 will remain centred between the shafts and that there will be no sidewise movement of the tailgate relative to the end of the truck platform. With the tailgate in platform level position, the pins 31 will be horizontal with the rounded corners 32 of the heads 29 disposed below said heads and towards the platform of the truck as shown in Figure 4, so that the tailgate may be swung about the pins to the upright position shown in dotted line to close the body of the truck.

What I claim as my invention is:

1. A tailgate hoist comprising a pair of arms adapted to be rockingly mounted at the rear of the truck platform, said arms being coupled for unitary swinging movement in a plane transverse to the truck platform, a shaft extending rearwardly and horizontally from the free end of each arm, a tailgate resting upon said shafts, means for swinging the arms, a member rockingly mounted on the underside of the tailgate and a connecting rod connecting each shaft with the member whereby to maintain said member equidistant from both of said shafts as the arms are raised or lowered.

2. A tailgate hoist comprising a pair of arms adapted to be rockingly mounted at the rear of the truck platform, said arms being coupled for unitary swinging movement in a plane transverse to the truck platform, a shaft extending at right angles from the free end of each arm, a tailgate carried by said shafts, means for swinging the arms, said shafts having sliding movement relative to the tailgate, and means connecting the tailgate to the shafts, said means including a toggle lever rockingly mounted on the tailgate and a rod pivotally connecting each end of the toggle lever to one of the shafts.

3. A tailgate hoist for trucks comprising a pair of arms adapted to be rockingly mounted at the rear of the truck platform, said arms being coupled for unitary swinging movement in a plane transverse to the truck platform, a shaft extending at right angles rearwardly from the outer end of each arm, a tailgate supported upon the shafts, means for rocking said arms, each shaft being hingedly mounted on a pin carried by an arm, said shafts having transverse sliding movement with respect to the tailgate when the arms are being moved by their rocking means, wherein the hinge pins carried by the arms are moved into alignment with each other when the tailgate is moved into its uppermost horizontal position.

4. A tailgate hoist adapted for mounting at the rear of a truck, said hoist comprising a pair of arms mounted to swing in a vertical plane parallel to the rear of the platform of said truck, means for swinging the arms, a shaft supported from the free end of each arm to normally project rearwardly from the arms and the rear of the truck, a tailgate secured to said shafts, the connection of each of said shafts to this arm being a single pivot pin disposed vertically when the tailgate is in its lowermost position, each of said pins being adapted to change from said vertical position to horizontal position as the arms swing from lowermost positions to uppermost positions, said tailgate being adapted to be swung upon said pins towards a vertical position when said arms are raised.

References Cited in the file of this patent

UNITED STATES PATENTS

| | | |
|---|---|---|
| 304,545 | Newell | Sept. 2, 1884 |
| 630,229 | Hoyt | Aug. 1, 1899 |
| 874,525 | McGranor et al. | Dec. 24, 1907 |
| 1,017,290 | Ham et al. | Feb. 13, 1912 |
| 1,612,447 | Larson et al. | Dec. 28, 1926 |
| 1,620,256 | Heise | Mar. 8, 1927 |
| 2,327,135 | Scott | Aug. 17, 1943 |
| 2,469,321 | Wood | May 3, 1949 |
| 2,622,445 | Benedict | Dec. 23, 1952 |